(12) United States Patent
Furusawa et al.

(10) Patent No.: US 6,499,586 B2
(45) Date of Patent: Dec. 31, 2002

(54) FEED ROLLER FOR RECORDING MEDIUM

(75) Inventors: Shigeharu Furusawa, Saitama (JP); Michihiro Sato, Yamagata (JP); Yoichi Munekata, Yamagata (JP); Katsuhiko Abiko, Yamagata (JP); Kazuo Kobayashi, Saitama (JP)

(73) Assignees: Pioneer Corporation, Tokyo (JP); Tohoku Pioneer Corporation, Yamagata (JP)

( * ) Notice: Subject to any disclaimer, the term of this patent is extended or adjusted under 35 U.S.C. 154(b) by 0 days.

(21) Appl. No.: 09/801,744

(22) Filed: Mar. 9, 2001

(65) Prior Publication Data
US 2001/0020571 A1 Sep. 13, 2001

(30) Foreign Application Priority Data
Mar. 10, 2000 (JP) ........................................ 2000-066138

(51) Int. Cl.[7] .............................................. B65G 13/071
(52) U.S. Cl. .................................. 198/781.02; 198/624
(58) Field of Search ............................ 198/781.02, 624, 198/780, 781.01

(56) References Cited

U.S. PATENT DOCUMENTS

| | | | | |
|---|---|---|---|---|
| 2,592,275 A | * | 4/1952 | Grosvenor | ................... 198/25 |
| 3,858,870 A | * | 1/1975 | Yabe et al. | .................... 271/51 |
| 3,889,798 A | * | 6/1975 | Jurgens et al. | .............. 198/127 |
| 4,232,914 A | * | 11/1980 | Bowen, III | .................. 308/215 |
| 4,325,474 A | * | 4/1982 | Rae | ............................. 198/781 |
| 4,421,224 A | * | 12/1983 | Dingman | .................... 198/781 |
| 4,425,869 A | * | 1/1984 | Hull | ............................. 118/314 |
| 4,524,861 A | * | 6/1985 | Matsushita | .................. 198/781 |
| 4,706,801 A | * | 11/1987 | Vessey | ....................... 198/781 |
| 4,728,967 A | * | 3/1988 | Tomita et al. | .............. 346/136 |
| 4,905,817 A | * | 3/1990 | Limbach et al. | ........... 198/458 |
| 4,930,618 A | * | 6/1990 | Roh | ............................ 198/781 |
| 5,147,024 A | * | 9/1992 | Yamada | ...................... 198/781 |
| 5,564,971 A | * | 10/1996 | Evensen | ..................... 451/504 |
| 5,655,201 A | * | 8/1997 | Islam et al. | ................. 399/322 |
| 5,833,372 A | * | 11/1998 | Nisley | ........................ 384/477 |
| 6,286,660 B1 | * | 9/2001 | Kalm | .......................... 198/872 |

* cited by examiner

Primary Examiner—Douglas Hess
(74) Attorney, Agent, or Firm—Sughrue Mion, PLLC

(57) ABSTRACT

A feed roller for a recording medium 1 includes a roller shaft 2 supplied with rotating force for feeding the recording medium, a roller body 3 made of an elastic material and provided with a center bore extending in a longitudinal direction through which the roller shaft 2 is inserted, and a pair of holding members 5a, 5b which rotate in association with the roller shaft 2 and hold the roller body 3 in a longitudinally compressed state by clamping opposite ends of the roller body 3.

12 Claims, 2 Drawing Sheets

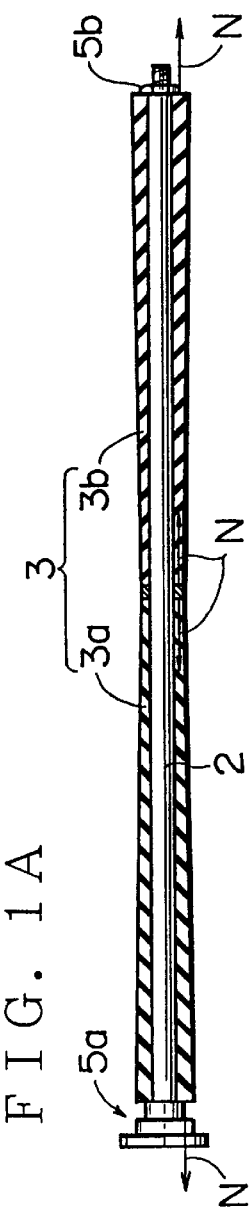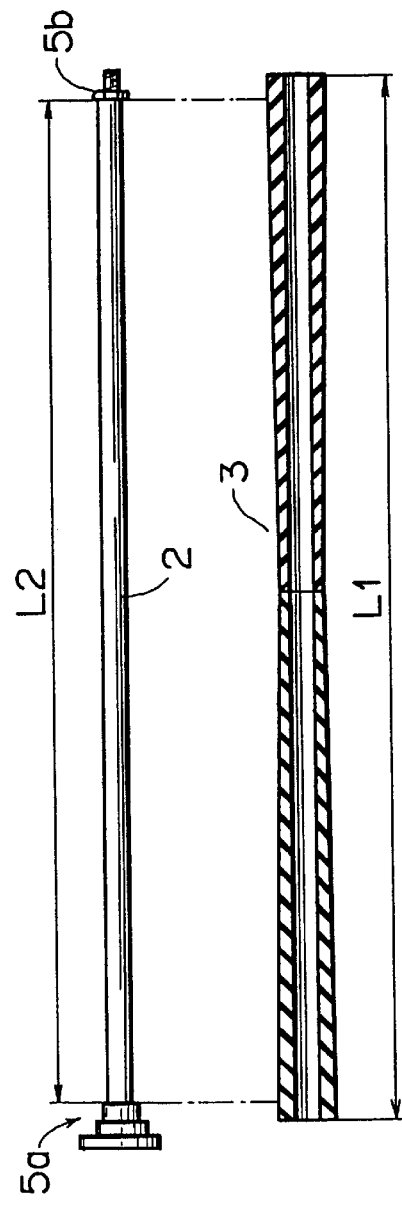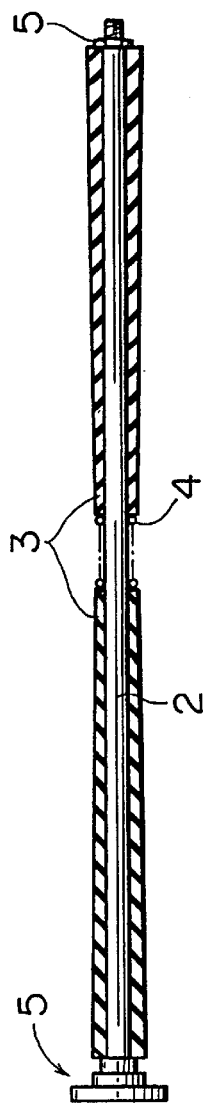
FIG. 1A
FIG. 1B
FIG. 4 PRIOR ART

FEED ROLLER FOR RECORDING MEDIUM

BACKGROUND OF THE INVENTION

1. Field of the Invention

The present invention relates to a feed roller of a roller unit for a recording medium, and more particularly to the feed roller of the roller unit for feeding the recording medium to an apparatus for reading, outputting, and processing information which has been recorded in the recording medium such as a CD, DVD, or the like.

2. Description of the Related Art

One example of a conventional roller unit for a recording medium including feed rollers of the type as described above is shown in FIGS. 3A and 3B. The feed rollers for the recording medium include roller shafts 2 which are supplied with rotating force for feeding a recording medium 1 such as CD, DVD, and rollers 3 formed of an elastic material such as rubber and having center bores through which the roller shafts 2 are inserted in a longitudinal direction to receive the rotating force from the roller shafts 2, thereby conducting the feed of the recording medium 1.

The rubber rollers 3 are tapered from both ends toward the center symmetrically in a longitudinal direction in order to prevent the recorded information recorded in the center of the recording medium from breakdown. Accordingly, the rubber rollers 3 are constructed in such a manner that their opposite end portions only are brought into contact with the recording medium 1 during the feed of the recording medium 1.

Operation of the conventional feed rollers for the recording medium constructed as above will be described below. When the roller shafts 2 are rotated, the rubber rollers 3 rotate following the rotation of the roller shafts 2 by friction between the roller shafts 2 and the rubber rollers 3, and thus, the recording medium 1 can be fed by the rotation of the rubber rollers.

In the event that the recording medium 1 is blocked by a stopper during the feed, a slippage occurs between the roller shafts 2 and the rubber rollers 3. This slippage will prevent the rubber rollers 3 from going on the rotation keeping contact with the recording medium 1, and thus, scratches on surfaces of the recording medium 1 can be avoided.

However, in the above described conventional feed rollers for the recording medium, the recording medium 1 cannot be fed because of the slippage between the roller shafts 2 and the rubber rollers 3, in case where feeding force of the rubber rollers 3 is smaller than frictional resistance between the recording medium 1 and the rubber rollers 3.

Conventionally, the feeding force required in the rubber rollers 3 has been obtained by inserting the roller shafts 2 into the center bores of the rubber rollers 3 with low pressure. In short, a force in a direction toward the roller shafts 2 has been imparted to the rubber rollers 3 by the low pressure insertion. This force will create friction between the roller shafts 2 and the rubber rollers 3, and as the result, the feeding force required in the rubber rollers 3 can be obtained.

However, the above described conventional feed rollers for the recording medium have had a problem that a diameter of the center bores of the rubber rollers 3 remarkably varies with temperature, and the feeding force of the rubber rollers 3 may also vary accordingly. For example, in case where the rubber rollers 3 are formed of the elastic material such as silicone rubber, the diameter of the center bores is increased by 0.03 mm at high temperature, and decreased by 0.03 mm at low temperature. Therefore, the feeding force is too weak at the high temperature, and too strong at the low temperature.

Further, there has been known another type of a feed roller for a recording medium as shown in FIG. 4. A compression spring 4 is provided at an intermediate position between two sections of the rubber roller 3. Both ends of the rubber roller 3 are held by holding members 5 which rotate in association with the roller shaft 2. Pressure fitting force is created on the rubber roller 3 in a longitudinal direction by elasticity of the compression spring 4, and this pressure fitting force will create friction between the holding members 5 and the rubber roller 3. This friction will make the feeding force of the rubber roller 3. However, in order to create the pressure fitting force in the longitudinal direction, it has been necessary that the above described conventional feed roller for the recording medium is provided with the compression spring 4 besides the rubber roller 3. This will increase components in number and incur a high production cost.

In view of the above, it is an object of the present invention to provide a feed roller for a recording medium which can obtain the required driving force only by a roller body without employing a compression spring, thus reducing number of components and production cost.

SUMMARY OF THE INVENTION

In order to solve the above described problems, there is provided, according to the present invention, a feed roller for a recording medium comprising a roller shaft supplied with rotating force for feeding the recording medium, a roller body made of an elastic material and provided with a center bore extending in a longitudinal direction through which the roller shaft is inserted, the roller body being adapted to receive the rotating force of the roller shaft thereby to conduct the feed of the recording medium, and a pair of holding members which rotate in association with the roller shaft and hold the roller body in a longitudinally compressed state by clamping opposite ends of the roller body.

According to the invention, the roller shaft is supplied with rotating force for feeding the recording medium. The roller body is provided with the center bore extending in the longitudinal direction through which the roller shaft is inserted. The pair of the holding members hold the roller body in the longitudinally compressed state by clamping the opposite ends of the roller body. Therefore, elasticity of the roller body itself will create pressure fitting force in the longitudinal direction. Because the roller body can obtain necessary driving force from the pressure fitting force, the compression spring need not be employed.

According to a second aspect of the invention, the roller body is separated into at least two sections. Therefore, because the holding members clamp and hold the roller body in the longitudinally compressed state, the divided sections apply forces with respect to each other thereby creating pressure fitting force in the roller body in the longitudinal direction. Thus, the roller body can obtain necessary driving force from the pressure fitting force, and the compression spring need not be employed.

According to a third aspect of the invention, feeding force of the roller body is set in such a manner that when the feed of the recording medium is interrupted, the roller body slips with respect to the roller shaft.

According to the third aspect of the invention, because the feeding force of the roller body is determined by the pressure fitting force occurring in the roller body in the longitudinal direction, that is, compressibility of the roller body, such feeding force that will make the roller body reliably slip with respect to the roller shaft when the feed of the recording medium is interrupted can be set.

BRIEF DESCRIPTION OF THE DRAWINGS

FIG. 1A is a cross sectional view showing an example of a feed roller for a recording medium according to the present invention;

FIG. 1B is an exploded sectional view of the feed roller for the recording medium of FIG. 1A.

FIG. 4 is a cross sectional view showing another example of a conventional feed roller for a recording medium.

DESCRIPTION OF THE PREFERRED EMBODIMENT

Figure 2:
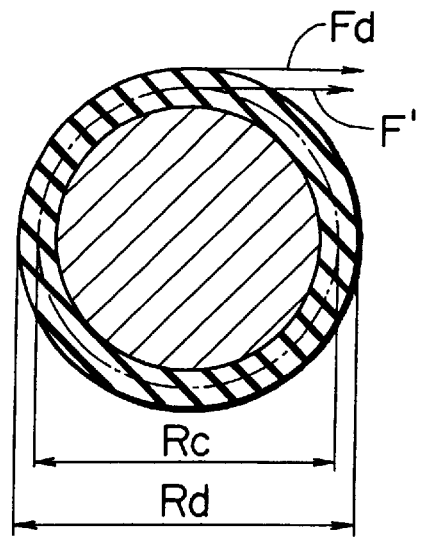
FIG. 2 is a cross sectional view of the feed roller for the recording medium according to the present invention.
Figure 3A:
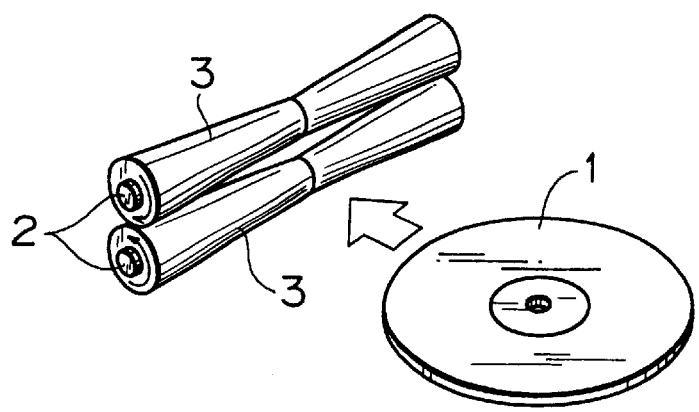
FIG. 3A is a perspective view showing an example of conventional feed rollers for a recording medium.
Figure 3B:
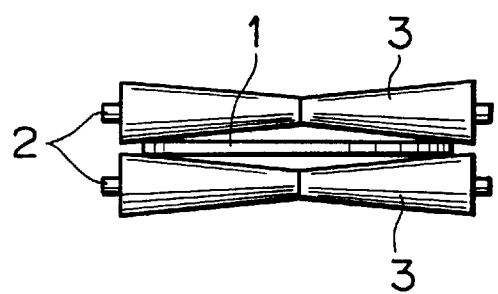
FIG. 3B is a front view of the conventional feed rollers for the recording medium of FIG. 3A.

The feed roller for the recording medium according to the present invention will be described below, referring to the drawings.

FIG. 1A is a sectional view showing an example of a feed roller for a recording medium according to the present invention. The feed roller for the recording medium includes a roller shaft 2 which is supplied with rotating force for feeding the recording medium such as a CD, DVD, or the like, a rubber roller 3 which is symmetrically tapered in a longitudinal direction to have an increased outer diameter at opposite ends, and provided with a center bore in the longitudinal direction through which the roller shaft 2 is inserted to receive the rotating force from the roller shaft 2 for conducting a feed of the recording medium, a flange-like holding member 5a provided at one end of the roller shaft 2, and a holding member 5b consisting of a washer and an E ring and provided at the other end of the roller shaft 2.

A pair of the holding members 5a, 5b rotate in association with the roller shaft 2, clamping the opposite ends of the rubber roller 3 to hold the rubber roller 3 in a longitudinally compressed state. As shown in an exploded sectional view in FIG. 1B, an inherent length L1 of the rubber roller 3 is longer than a distance between the holding members 5a and 5b. The rubber roller 3 is divided into two roller sections 3a, 3b.

So constructed as above, the rubber roller 3 can obtain the feeding force as described below. The rubber roller 3 is clamped at the opposite ends by the holding members 5a, 5b and compressed in the longitudinal direction, whereby the roller sections 3a and 3b are applied with forces with respect to each other to create a pressure fitting force N.

Provided that the coefficient of static friction between the rubber roller 3 and the holding members 5a, 5b which rotate in association with the roller shaft 2 as shown in FIG. 2 is $\mu$, frictional force F' is generated on a center diameter Rc of the rubber roller 3 by this pressure fitting force N as shown in the following equation (1).

$$F'=\mu N \quad (1)$$

Provided that this frictional force F' creates feeding force Fd, the following equation (2) is deducted from balance of moments.

$$Rc/2 \times F' = Rd/2 \times Fd \quad (2)$$

From the above equations (1) and (2), $$\mu N = Rd/Rc \times Fd$$

$$\therefore Fd = \mu N Rc/Rd \quad (3)$$

As the result, the feeding force Fd as shown in the equation (3) can be obtained from the pressure fitting force N. As apparent from the foregoing, the rubber roller 3 receives the rotating force of the roller shaft 2 by way of the holding members 5a, 5b thereby to generate the feeding force.

As described, the holding members 5a, 5b clamp the opposite ends of the rubber roller 3 and hold it in the longitudinally compressed state thereby to generate the pressure fitting force N in the rubber roller 3, and the required feeding force can be obtained. Accordingly, there is no need of the compression spring, and the number of components will be reduced, resulting in a low production cost.

By the way, as already described referring to the conventional roller unit, it is commonly known that when the feed of the recording medium 1 is interrupted by an abutment against the stopper or the like, the roller shafts 2 and the rubber rollers 3 slip with respect to each other thereby preventing the recording medium 1 from being damaged. Relation between the feeding force and the slippage occurring between the roller shafts 2 and the rubber rollers 3 is as follows; When the feeding force is larger than the frictional resistance between the recording medium 1 and the rubber rollers 3, the recording medium 1 can be fed. On the contrary, when the frictional resistance between the rubber rollers 3 and the recording medium 1 becomes larger due to the interruption of the feed of the recording medium 1, and as the result, the frictional resistance grows larger than the feeding force of the rubber rollers 3, there will be arisen a slippage between the roller shafts 2 and the rubber rollers 3. Accordingly, the feeding force of the rubber rollers 3 must be set at a value larger than the frictional resistance during the feed of the recording medium 1, and smaller than the frictional resistance when the feed of the recording medium 1 is interrupted.

In the feed roller for the recording medium according to the present invention, the feeding force of the rubber roller 3 corresponds to the pressure fitting force N as shown in the equation (3). This pressure fitting force N corresponds to the compressibility of the rubber roller 3. Therefore, in case where the distance L2 between the holding members 5a and 5b has been predetermined according to a size of the recording medium, the feeding force of the rubber roller 3 can be precisely adjusted by adjusting the length of the rubber roller 3 in the longitudinal direction and adjusting the compressibility.

In this manner, the feed roller for the recording medium according to the present invention can reliably obtain the feeding force which is larger than the frictional resistance during the feed of the recording medium 1, and smaller than the frictional resistance when the feed of the recording medium 1 is interrupted. Therefore, when the feed of the recording medium is interrupted, the roller shaft 2 and the rubber roller 3 slip with respect to each other, thus preventing damage of the recording medium 1.

Moreover, the rubber roller 3 expands in its total length at high temperature to increase the feeding force with the increased pressure fitting force, while the rubber roller 3 shrinks in the total length at low temperature to decrease the feeding force with the decreased pressure fitting force. In case where the elastic material such as silicone rubber has been employed to form the rubber roller 3, it expands by 0.75 mm at the high temperature and shrinks by 0.69 mm at the low temperature in the longitudinal direction.

Meanwhile, since the diameter of the center bore is enlarged at the high temperature, and reduced at the low temperature as described referring to the conventional structure, the feeding force will be decreased at the high temperature and increased at the low temperature. As apparent from the foregoing, the longitudinal length of the rubber roller 3 and the diameter of the center bore will vary with the change of the temperature in a manner compensating the change of the feeding force. Therefore, the change of the feeding force can be made minimum, and the stable feeding force can be obtained.

Although the rubber roller 3 is composed of the two roller sections 3a, 3b in the above described embodiment, it is to be noted that the rubber roller 3 composed of either a single elastic member or a plurality of elastic members can attain substantially the same effect.

What is claimed is:

1. A feed roller for a recording medium comprising:
   a roller shaft supplied with rotating force for feeding the recording medium,
   a roller body made of an elastic material and respectively provided with a center bore extending in a longitudinal direction through which said roller shaft is inserted, said roller body being adapted to receive said rotating force of said roller shaft thereby to conduct the feed of said recording medium, and
   a pair of holding members which rotate in association with said roller shaft and hold said roller body in a longitudinally compressed state by clamping opposite ends of said roller body,
   wherein a length of said roller body in an uncompressed state is greater than a length of said roller shaft.

2. The feed roller for the recording medium as claimed in claim 1, wherein said roller body is separated into at least two sections.

3. The feed roller of claim 2, wherein said at least two sections consists of a first section and a second section.

4. The feed roller of claim 3 wherein no compression spring is required between said first section and said second section.

5. The feed roller for the recording medium as claimed in claim 1, wherein feeding force of said roller body is set in such a manner that when the feed of said recording medium is interrupted, said roller body slips with respect to said roller shaft.

6. The feed roller of claim 1, wherein:
   a decrease in a temperature of said roller body (a) radially shrinks a diameter of said bore and increases friction between said roller shaft and said roller body, and (b) longitudinally shrinks said roller body to decrease the friction between said pair of holding members and said roller body and compensates for the increase in friction due to said radial shrinking of the diameter of said bore; and
   an increase in a temperature of said roller body (a) radially expands the diameter of said bore and decreases friction between said roller shaft and said roller body, and (b) longitudinally expands said roller body to increase the friction between said pair of holding members and said roller body and compensates for the decrease in friction due to said radial expansion of the diameter of said bore.

7. The feed roller of claim 1, wherein said pair of holding members comprise:
   a first holding member at a first end of said roller shaft comprising a flange; and
   a second holding member at a second end of said roller shaft comprising a washer and an E ring.

8. The feed roller of claim 1, wherein said roller body is a unitary piece.

9. The feed roller of claim 1 wherein:
   a frictional force, F', between said roller body and said roller shaft is determined by $F'=\mu N$, wherein $\mu$ is a coefficient of static friction between said roller body and said pair of holding members, and N is a pressure fitting force between said roller body and said pair of holding members due to said longitudinal compression of said roller body;
   said frictional force, F', is greater than a first feeding force when an interruption in the feed of said recording medium has not occurred; and
   said frictional force, F', is less than a second feeding force when said interruption in the feed of the recording medium has occurred.

10. A feed roller of a roller unit for a recording medium, comprising:
    a roller shaft supplied with a rotational force for feeding the recording medium;
    an elastic roller body, said elastic roller body having a longitudinal bore in which said roller shaft is positioned, and said elastic roller body adapted to receive said rotational force; and
    a first holding member attached to a first end of said roller shaft and a second holding member attached to a second end of said roller shaft, whereby said roller body is longitudinally compressed between said first holding member and said second holding member, and said first holding member and second holding member rotate in association with said roller shaft.

11. A feed roller for a roller unit for a recording medium, comprising:
    a pair of holding members supplied with a rotational force for feeding the recording medium; and
    an elastic roller body attached between said pair of holding members and adapted to receive said rotational force, wherein said elastic roller body is longitudinally compressed between said pair of holding members to transfer said rotational force to said elastic roller body.

12. A feed roller according to claim 11 further comprising:
    a roller shaft; and wherein:
    said roller body has a longitudinal bore in which said roller shaft is positioned; and
    said pair of holding members are attached to the ends of said roller shaft, whereby said holding members and said roller shaft rotate in association with each other.

* * * * *